United States Patent Office 3,492,366
Patented Jan. 27, 1970

3,492,366
REMOVAL OF TRACE AMOUNTS OF CYCLO-
PENTADIENE FROM ISOPRENE BY FLUID-
BED ADSORBENT
Olaf H. Winter, Akron, Ohio, assignor to The Goodyear
Tire & Rubber Company, Akron, Ohio, a corporation
of Ohio
No Drawing. Filed Mar. 17, 1967, Ser. No. 623,817
Int. Cl. C07c 7/12, 11/18
U.S. Cl. 260—681.5                               11 Claims

ABSTRACT OF THE DISCLOSURE

A method of treating a mixture consisting essentially of 1,3-cyclopentadiene and other hydrocarbons which comprises contacting the said mixture in its gaseous state in a fluidized bed of solid particulate material to reduce its 1,3-cyclopentadiene content. Isoprene containing 400 p.p.m. cyclopentadiene was purified over 10% CuO on alumina at 1 atm. and 140° C. to 2 p.p.m. CPD in fluid bed at 10 LHSV vs. 17 p.p.m. in fixed bed at 5 LHSV.

---

This invention relates to a method of treating hydrocarbons. More particularly, this invention relates to a method of removing 1,3-cyclopentadiene from hydrocarbons by treating the 1,3-cyclopentadiene and hydrocarbon mixture in a fluidized bed of particulate material.

It is known that 1,3-cyclopentadiene deactivates or retards the catalytic action of various catalysts used for the polymerization of various unsaturated hydrocarbons. Thus, it is usually desirable to reduce or eliminate the 1,3-cyclopentadiene content of those unsaturated hydrocarbons which are to be polymerized or used as diluents in polymerizations. For similar reasons it is usually desirable to reduce or eliminate 1,3-cyclopentadiene from other hydrocarbons such as saturated hydocarbons and aromatic hydrocarbons, particularly where they are used as diluents in polymerizations.

Therefore, it is an object of this invention to provide a method of reducing the 1,3-cyclopentadiene content of hydrocarbons.

According to this invention, it was unexpectedly found that 1,3-cyclopentadiene can be selectively and substantially removed from a mixture comprising at least one hydrocarbon and 1,3-cyclopentadiene which comprises treating the said mixture in its gaseous state in a fluidized bed of solid particulate material, the said material comprising at least one oxide of a metal selected from the group consisting of copper, chromium, and mixtures thereof. The oxides of such metals include cupric oxide, cuprous oxide, chromic oxide, chromous oxide and mixtures thereof including copper chromite.

It is a particular advantage of this invention that 1,3-cyclopentadiene can be selectively and almost completely removed from hydrocarbon mixtures comprising 1,3-cyclopentadiene with at least one other hydrocarbon exemplary of which are saturated aliphatic, saturated cycloaliphatic, unsaturated aliphatic, unsaturated cycloaliphatic, and aromatic hydrocarbons, and mixtures of such hydrocarbons, without an appreciable removal of the saturated, unsaturated or aromatic hydrocarbons from the hydrocarbon mixture. Other methods utilized for removal of 1,3-cyclopentadiene from hydrocarbons, particularly unsaturated hydrocarbons, such as extractive distillation, chemical reaction, and hydrogenation, generally may also remove an appreciable portion of the unsaturated hydrocarbons from such a mixture.

It has been found in the practice of this invention that a hydrocarbon which contains 1,3-cyclopentadiene can be treated to reduce the 1,3-cyclopentadiene content of the hydrocarbon to at least as low as 0.1 part of 1,3-cyclopentadiene per million parts (p.p.m.) by weight of the hydrocarbon.

A fluidized bed of solid particles is a complex physical phenomenon and chemical reactions in a fluidized bed are not generally predictable from fixed beds of solid particles. Such chemical reactions are particularly unpredictable where the solid particles potentially promote competing chemical reactions and where it is not known if the overall chemical reaction is controlled by physical characteristics of the particles such as for example, diffusion to or from the particle surface, adsorption onto or off of its surface, diffusion into or out from the pores of the particle, or the chemical reaction itself. Thus many chemical reactions which can be conducted in a fixed bed of solid particles are adversely affected by a fluidized bed of the solid particles.

Fluidized beds are generally characterized by the suspension of solid particles in an upward flowing gas stream. As the velocity of a gas passing upward through a packed bed of solid particles, is increased, the pressure drop across the bed becomes substantially equal to the weight of the bed per unit area so that at least a portion of the particles are somewhat separated in that they do not support each other and move in agitation relative to each other. This state of the bed is known as a dense phase fluidized bed. The dense phase fluidized bed behaves much like a fluid wherein it tends to assume the shape of its container and tends to have the ability to flow like a liquid. At specified particle characteristics, bed geometry and gas velocity, the bed has definite properties such as density, heat capacity, thermal conductivity and viscosity. A column of fluidized particles exerts a hydrostatic pressure about equal to the average density of the bed times the height of the bed. The fluidized state is a relatively stable condition and can be maintained indefinitely with properly sized particles, with little loss of particles entrained in the effluent gas. The bed has a distinct surface, which is similar to a boiling liquid in that small bubbles of fluidizing gas appear to burst at the surface, a condition sometimes referred to as a "boiling bed."

At higher velocities, the smaller particles are entrained with the gas and form a dilute phase above the bed. This is the two-phase region. The larger particles form the dense lower phase, the smaller particles compose the dilute upper phase. This is a relatively unstable condition and eventually most of the smaller particles will be lost from the system.

At still higher velocities, the entire bed is entrained with the gas. This forms a dilute phase of solid-in-gas suspension and is often referred to as pneumatic transport.

In the practice of this invention it is generally preferred that the gas velocity upward through the bed of solid particles is at least sufficient to form a dense phase fluidized bed for the average particle size and density of the particles used and less than the gas velocity required to entrain the entire bed at pneumatic transport conditions.

Various saturated, unsaturated and aromatic hydrocarbons and their mixtures which contain 1,3-cyclopentadiene can be treated by the fluidized bed of this invention. Suitable hydrocarbon mixtures can be petroleum or coal tar distillates having a boiling point at atmospheric pressure of from about −10° C. to about 80° C. Representative examples of these and other various saturated hydrocarbons which can be treated are aliphatic hydrocarbons such as the butanes, the pentanes, the hexanes, the heptanes and to octanes; aromatic hydrocarbons such as benzene, and toluene and various unsaturated hydrocarbons representative of which are olefins such as ethylene, propylene, butene and methyl butene, and diolefins such as isoprene, 2-ethyl butadiene, and butadiene. Various mixtures of the saturated, unsaturated and aromatic hydrocarbons can also be treated.

Hydrocarbons used in polymerization processes either as monomers or as diluents can contain 1,3-cyclopentadiene in amounts of from about 500 to about 5000 p.p.m. depending on the origin of the hydrocarbons. If the hydrocarbons have undergone special treatment, their 1,3-cyclopentadiene content can be as low as from about 2 to about 50 p.p.m. and in some instances as low as 1 p.p.m.

The oxides of the metals used in this invention may be used in their pure form, or they may be supported by various carriers. Generally, it is desired to combine the oxides with carriers such as structural materials having less density to facilitate fluidization of the bed of particles at lower gas velocities and more porosity than that of the the said oxides in order to provide a greater surface area per unit of weight of the oxides. It is usually desired that such carriers are inert in that they do not adversely affect the removal of 1,3-cyclopentadiene from the hydrocarbon. Although it is understood that some carriers may be acidic in nature, and thus promote in some degree the polymerization of some unsaturated hydrocarbons, such a property does not itself prevent these carriers from being classified as inert within the scope of this invention. Various materials may be used as a structural support for the oxides and are generally known to those skilled in the catalyst art. Representative examples of such supporting materials are relatively low surface area and relatively nonporous materials such as alundum and silicon carbide. Representative relatively low surface area and relatively porous materials are pumice and diatomaceous earths. Representative relatively high surface area and relatively nonporous materials are kaolin and carbon black. Representative relatively high surface area and relatively porous materials are attapulgite, alumina, magnesia, silica gel, silica-alumina, silica-magnesia, and charcoals from coal, bone and wood. Thus, the supporting materials can be inorganic or they can be organic in composition such as the carbon blacks and charcoals. For example, an oxide of copper, chromium and/or their mixtures may be deposited by co-precipitation or by other techniques known to those skilled in the catalyst art on particles of silica, alumina, or a mixture of silica or alumina. A wide range of particle sizes for the oxides or supported oxides can be used, such as for example, from about 7/16 inch to about 400 sieve number (U.S. Standard A.S.T.M. designation), although it is usually more preferable to use a sieve number of from about 45 to about 325.

In this invention it is usually desired to pass the hydrocarbons containing the 1,3-cyclopentadiene while in a gaseous state through the fluidized bed of the oxide particles or particles of a carrier-supported oxide for a sufficient time to remove at least a portion of the 1,3-cyclopentadiene.

The invention can be practiced over a wide temperature range such as temperatures from about 0° C. to about 200° C., and even up to about 300° C., although the temperature should be sufficient to vaporize the hydrocarbon mixture and should not substantially exceed that at which appreciable cracking of the hydrocarbons occurs. It is usually desired to conduct the reaction at a temperature of from about 80° C. to about 180° C. The pressure can vary from above to below atmospheric pressure. A suitable reaction pressure is from about 0.1 to about 80 pounds per square inch to facilitate control over process variables such as pumping rates.

When the invention is practiced as a continuous process the optimum flow rate of the hydrocarbon through the particulate bed for 1,3-cyclopentadiene removal can be measured by volumes of liquid hydrocarbon treated at about 25° C. and at a pressure of about one atmosphere, per volume of the solid particles per hour and is known as the liquid hourly space velocity or LHSV. The volume of the solid particles is measured as the volume of the reactor displaced by the bulk of such particles which is the sum of the volumes of the particles and their void space. A suitable LHSV is generally from about 0.1 to about 50. The LHSV can be adjusted by one skilled in the art to facilitate fluidization of the bed of particles and to remove the amount of 1,3-cyclopentadiene desired. It is understood that the particle side and density of the solid particles can be adjusted by methods well known to those skilled in the art so that the gaseous flow rate is sufficient to fluidize the bed of particles. If desired, an inert gas, an example of which is nitrogen, can be added with the gaseous hydrocarbons to assist in fluidizing the bed.

In some instances, in the practice of this invention, the oxides become less effective in removing the 1,3-cyclopentadiene after a continued exposure of the oxides to hydrocarbons which contain 1,3-cyclopentadiene. It has been found that the effectiveness of the oxides can be restored by regeneration. Various methods for regeneration of the oxides are treatment with steam, by treatment in various oxidizing atmospheres and by a combination of such methods. Various oxidizing atmospheres can be used for such treatments representative of which are air, oxygen and nitrogen dioxide atmospheres.

The following examples further illustrate this invention. The parts and percentages are by weight unless otherwise indicated.

EXAMPLE 1

(A) Fixed bed.—To a suitable reactor was charged 32 parts of one-eighth inch granules comprising 10 percent by weight of cupric oxide on alumina (T–317 obtained from the Girdler Chemicals Department of Chemetron Chemicals, hereinafter referred to as T–317), to form a fixed bed of the granules. The reactor was heated to 138° C. A reaction was conducted as a continuous process by continuously charging to the bottom of the reactor vaporized isoprene containing 400 p.p.m. of 1,3-cyclopentadiene at 138° C., under a pressure of about 45 pounds per square inch gauge, and at an LHSV of 7 for about 2 hours. During the 2-hour period of operation gaseous isoprene leaving the top of the reactor was condensed and found to contain an average of 14 p.p.m. of 1,3-cyclopentadiene, and isoprene leaving the top of the reactor at the end of the 2-hour period contained 36 p.p.m. of 1,3-cyclopentadiene. During the two hours of operation, 9.4 parts of isoprene were treated per part of catalyst.

(B) Fluidized bed.—To the reactor was charged 59 parts of 140 to 200 sieve number (U.S. Standard sieve size) particles of crushed T–317 granules to form a fixed bed. The reactor was heated to 137° C. A fluidized bed reaction was conducted as a continuous process by continuously charging to the bottom of the reactor vaporized isoprene containing 400 p.p.m. of 1,3-cyclopentadiene at 137° C. under a pressure of about 0.1 pounds per square inch gauge, and at an LHSV of about 5 for about 7 hours. During the 7-hour period of operation, gaseous isoprene leaving the top of the reactor was condensed and found to contain an average of 8 p.p.m. of 1,3-cyclopentadiene, and isoprene leaving the top of the reactor at the end of the 7-hour period contained 28 p.p.m. of 1,3-cyclopentadiene. During the seven hours of operation, 11.3 parts of isoprene were treated per part of catalyst.

EXAMPLE 2

(A) Fixed bed.—To a suitable reactor was charged 59 parts of one-eighth inch granules comprising 10 percent by weight of cupric oxide on alumina (T–317 obtained from the Girdler Chemicals Department of Chemetron Chemicals, hereinafter referred to as T–317), to form a fixed bed of the granules. The reactor was heated to 138° C. A reaction was conducted as a continuous process by continuously charging to the bottom of the reactor vaporized isoprene containing 400 p.p.m. of 1,3-cyclopentadiene at 138° C., under a pressure of about 0.1 pound per square inch gauge, and at an LHSV of 5 for about seven hours. During the 7-hour period of operation gaseous isoprene leaving the top of the reactor was condensed and found to contain an average of 17 p.p.m. of 1,3-cyclopentadiene, and isoprene leaving the top of the reactor at the end of the 7-hour period contained 43 p.p.m. of 1,3 - cyclopentadiene. During the 7 hours of operation 11.3 parts of isoprene were treated per part of catalyst.

(B) Fluidized bed.—To the reactor was charged 88 parts of 100 to 140 sieve number (U.S. Standard sieve size) particles of crushed T-317 granules to form a fixed bed. The reactor was heated to 140° C. A fluidized bed reaction was conducted as a continuous process by continuously charging to the bottom of the reactor vaporized isoprene containing 400 p.p.m. of 1,3-cyclopentadiene at 140° C. under a pressure of about 0.2 pound per square inch gauge, and at an LHSV of about 10 for about 4 hours. During the 4-hour period of operation, gaseous isoprene leaving the top of the reactor was condensed and found to contain an average of 1.5 p.p.m. of 1,3-cyclopentadiene, and isoprene leaving the top of the reactor at the end of the 4-hour period contained 12 p.p.m. of 1,3-cyclopentadiene. During the 4 hours of operation, 15.4 parts of isoprene were treated per part of catalyst.

Thus, in these examples, the method of this invention is exemplified where the removal of 1,3-cyclopentadiene from a mixture comprising 1,3-cyclopentadiene and isoprene by passing the mixture in its gaseous state upward through a bed of particles, the said particles comprising cupric oxide on alumina, is unexpectedly substantially increased by fluidizing the bed of particles. In particular, in Example 1, the removal of 1,3-cyclopentadiene was increased by 43 percent and in Example 2, the removal of 1,3-cyclopentadiene was increased by 91 percent, thereby preparing an isoprene substantially more suitable for stereospecific polymerization. It is to be understood if various other hydrocarbons, for example, the aliphatic hydrocarbons such as the butanes, the pentanes, the hexanes, the heptanes, and the octanes, as well as aromatic hydrocarbons such as benzene and toluene, are mixed with the 1,3-cyclopentadiene and isoprene mixture, essentially the same unexpected beneficial results can be obtained.

While certain representative embodiments and details have been shown for the purpose of illustrating the invention, it will be apparent to those skilled in this art that various changes and modifications may be made therein without departing from the spirit or scope of the invention.

What is claimed is:

1. A method of removing a 1,3-cyclopentadiene from a mixture consisting essentially of at least one hydrocarbon and 1,3-cyclopentadiene which comprises treating the said mixture in its gaseous state with a fluidized bed of solid particulate material, the said material comprising at least one oxide of a metal selected from the group consisting of copper, chromium and mixtures thereof at a temperature of from about 0° C. to about 200° C. but not exceeding the cracking temperature of the hydrocarbons.

2. A method according to claim 1 wherein the said gaseous mixture is passed upward through the said particulate material with at least sufficient velocity to form a dense phase fluidized bed.

3. A method according to claim 1 wherein the said oxide is selected from the group consisting of cupric oxide, cuprous oxide, chromic oxide, chromous oxide and mixtures thereof.

4. A method according to claim 3 wherein the 1,3-cyclopentadiene content is reduced to as low as 0.1 part of 1,3-cyclopentadiene per million parts by weight of hydrocarbon.

5. A method according to claim 3 wherein the said oxides are supported by an inert carrier.

6. A method according to claim 3 wherein the said mixture comprises 1,3-cyclopentadiene, and at least one of the group consisting of saturated aliphatic hydrocarbons, saturated cycloaliphatic hydrocarbons, unsaturated aliphatic hydrocarbons, unsaturated cycloaliphatic hydrocarbons, and aromatic hydrocarbons.

7. A method according to claim 3 wherein the said hydrocarbon is a petroleum or coal tar distillate having a boiling point at atmospheric pressure of from about −10° C. to about 150° C.

8. A method according to claim 6 wherein the said hydrocarbon is isoprene.

9. A method according to claim 6 wherein the said hydrocarbon is butadiene.

10. A method according to claim 1 wherein 1,3-cyclopentadiene is substantially removed from a mixture comprising 1,3 cyclopentadiene and isoprene which comprises passing the said mixture in its gaseous state upward through a bed of solid particles with at least sufficient velocity to form a dense phase fluidized bed of the solid particles, the said solid particles comprising at least one oxide selected from cupric oxide, cuprous oxide, chromic oxide, chromous oxide and their mixtures, wherein the said oxides are supported by an inert carrier.

11. The method according to claim 10 where the solid particles comprise cupric oxide.

References Cited

UNITED STATES PATENTS

| 3,230,157 | 1/1966 | Hill et al. | 203—53 |
| 3,297,776 | 1/1967 | Reich et al. | 260—681.5 |
| 3,439,060 | 4/1969 | Kempton | 260—681.5 |

FOREIGN PATENTS

| 990,617 | 4/1965 | Great Britain. |

PAUL M. COUGHLAN, Jr., Primary Examiner

G. E. SCHMITKONS, Assistant Examiner

U.S. Cl. X.R.

260—666, 674, 677